United States Patent [19]

Gyugyi et al.

[11] Patent Number: 5,168,437
[45] Date of Patent: Dec. 1, 1992

[54] PHASE DISPLACED, MULTIPLE INVERTER BRIDGE CIRCUITS WITH WAVEFORM NOTCHING FOR HARMONIC ELIMINATION

[75] Inventors: Laszlo Gyugyi; Eric J. Stacey, both of Penn Hills Twp., Allegheny County

[73] Assignee: Westinghouse Electric Corp., Pittsburgh, Pa.

[21] Appl. No.: 612,647

[22] Filed: Nov. 13, 1990

[51] Int. Cl.⁵ .......................................... H02M 7/521
[52] U.S. Cl. ........................................ 363/42; 363/43; 363/72
[58] Field of Search ................. 363/41, 42, 43, 65, 363/72

[56] References Cited

U.S. PATENT DOCUMENTS

| | | | |
|---|---|---|---|
| 3,324,376 | 6/1967 | Hunt | 363/42 |
| 3,792,286 | 2/1974 | Meier | 307/58 |
| 3,876,923 | 4/1975 | Humphrey et al. | 318/227 |
| 4,050,006 | 9/1977 | Stich | 363/98 |
| 4,063,143 | 12/1977 | Forstbauer | 363/43 |
| 4,204,264 | 5/1980 | Lipman | 363/71 |
| 4,245,290 | 1/1981 | Lipman | 363/41 |
| 4,321,663 | 3/1982 | Krtek | 363/137 |
| 4,870,557 | 9/1989 | Stacey | 363/40 |
| 4,975,822 | 12/1990 | Lipman | 363/40 |

Primary Examiner—William H. Beha, Jr.

[57] ABSTRACT

An apparatus and method for reducing certain harmonics in the output of static inverters. Static inverters which employ a switching device arranged in a bridge circuit to convert direct current power to alternating current power produce undesired harmonics in the output of the inverter. Harmonic neutralization techniques are further improved by the invention utilizing selective notching of the inverter pole voltage and a coordinate phase shift between the set of pole voltages produced by the individual inverters. The notch angles in the individual pole voltage outputs are chosen to minimize or eliminate specific undesired harmonics.

20 Claims, 8 Drawing Sheets

PHASE DISPLACED, MULTIPLE INVERTER BRIDGE CIRCUITS WITH WAVEFORM NOTCHING FOR HARMONIC ELIMINATION

FIELD OF THE INVENTION

Static inverters, using semiconductor switching devices, are widely used for conversion of DC (direct current) power to AC (alternating current) power. One application for large power rated units includes using the static inverter to control AC power systems and generating a controllable leading or lagging reactive current in those AC power systems. Control of undesired harmonics is achieved by use of the waveform of the bridge circuit, the phase between bridge circuits, and phase between recombination of voltages from the bridges by the transformers.

The most frequently used inverter employs a three-phase bridge circuit as one component to generate a balanced three-phase output. In the basic operation, the inverter produces a square-like output voltage waveform, as shown in FIG. 2. This waveform has a significant amount of harmonic distortion, including the 5th, 7th, 11th, and 13th harmonics, which are objectionable from the viewpoint of practical applications. There are two basic approaches to reducing the distortion in the output voltage waveform. One employs the technique of pulse-width modulation (PWM), the other that of the harmonic neutralization. The PWM approach fabricates the output voltage waveform from a large number of pulses, each generally of different width. The width of the pulses vary so that the total output waveform has a strong sinusoidal component at the wanted fundamental frequency, as shown in FIG. 3. PWM is often used in the industrial drive and motor control application. These applications also use notching of the waveform to eliminate distortion, but because industrial drive controls require control over a wide operating or speed range, including around zero, such prior notched waveforms are not used in conjunction with phase shifted inverters and output transformers.

The harmonic neutralization approach employs a number of basic inverters, which are operated with a predefined phase-shift with respect to each other, and the output voltage waveforms of which are combined by an appropriate transformer arrangement. Depending on the number of inverters used, this so-called multiphase harmonic neutralization technique cancels certain harmonics in the output. For example, with two inverters (12-pulse arrangement), shown in FIG. 4, when used without notching the 5th and the 7th are cancelled. With four inverters (24-pulse arrangement) the 5th, 7th, 11th, and 13th are cancelled.

Both the PWM technique and the harmonic neutralization approach have significant practical problems, particularly in relatively high power applications. The PWM technique increases the switching rate of the power semiconductors significantly (over an order of magnitude), which increases the switching losses to a level unacceptable in high power applications. The harmonic neutralization approach retains low switching rate, however, its implementation requires a complex transformer arrangement which is too expensive for many applications.

There were efforts made to minimize the cost of the transformer arrangement required for harmonic neutralization. U.S. Pat. No. 4,870,557, which is incorporated herein by reference, describes "quasi harmonic neutralized" inverters which utilize simpler transformer arrangements, or transformer configurations which employ relatively "standard" transformers used normally in power systems. However, these quasi harmonic neutralized schemes eliminate only some of those harmonics which would be cancelled by proper harmonic neutralization, the others are only reduced from their original magnitudes.

SUMMARY OF THE INVENTION

Our invention uses quasi harmonic neutralized schemes, in which the basic inverters are operated with limited pulse width modulation and specially selected relative phase displacement in order to eliminate or further minimize those significant harmonics which are not cancelled by the normal quasi harmonic neutralization process. Selective "notching" of the inverter pole voltages and coordinated phase shift between the set of pole voltages produced by the individual inverters are simultaneously utilized with coordinated phase shift of the output transformers. The invention can use relatively simple transformer arrangements and relatively low switching rates for the power semiconductors in the inverters, which result in low cost and low operating losses.

DESCRIPTION OF PREFERRED EMBODIMENTS

Figure 1:
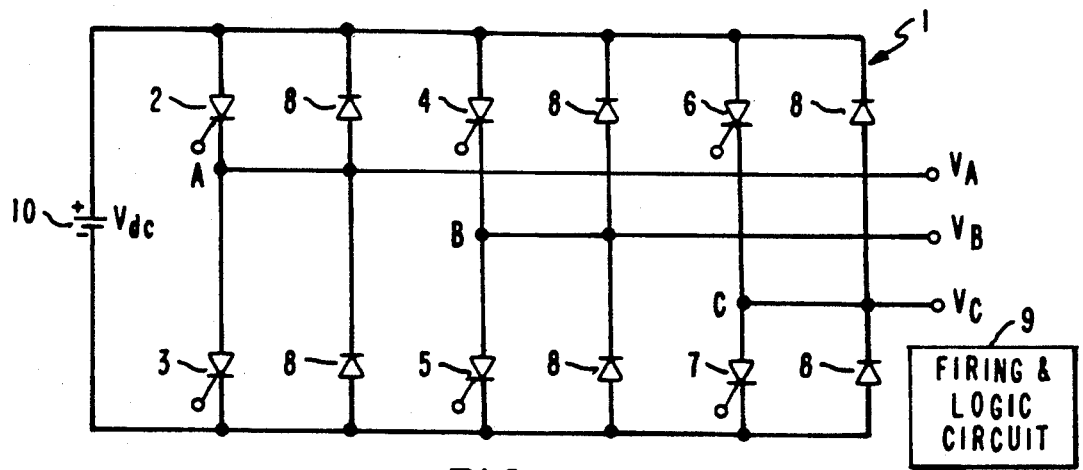
FIG. 1 is a schematic diagram of a three-phase static inverter.
Figure 2:
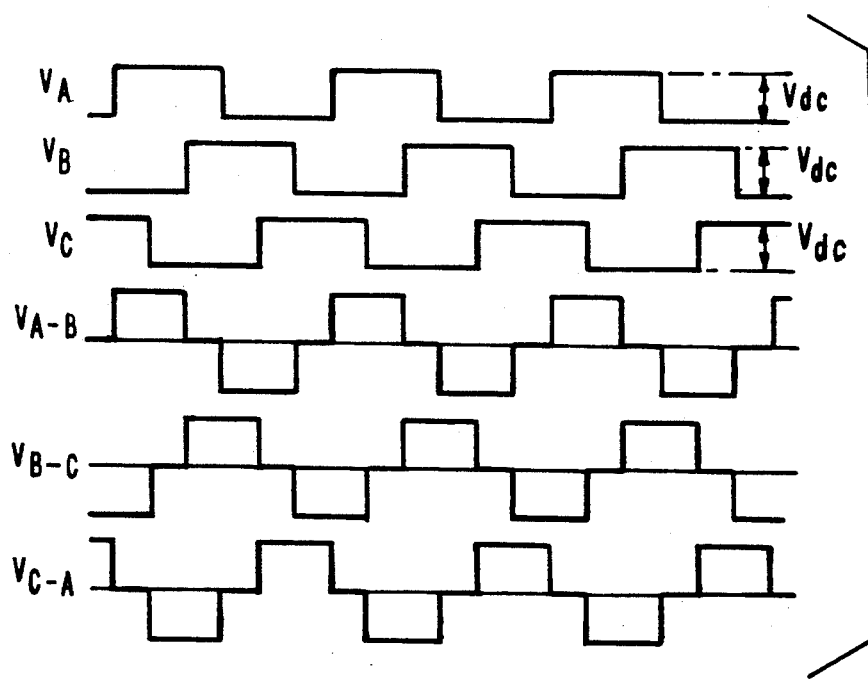
FIG. 2 is a typical output voltage waveform of a three-phase inverter such as that of FIG. 1.
Figure 3:
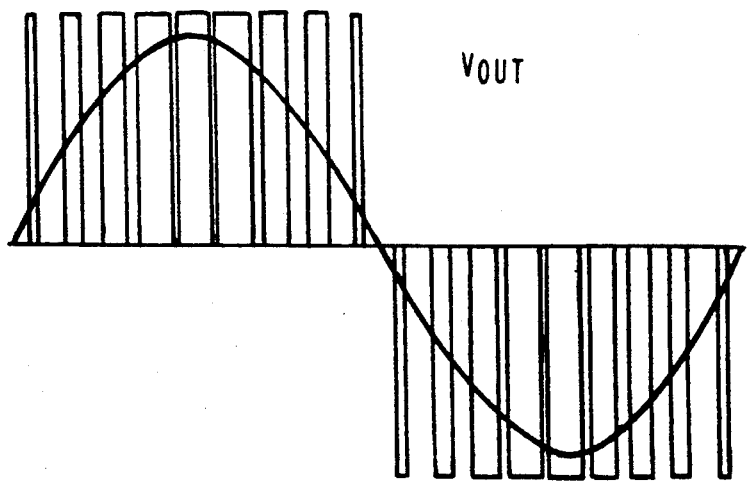
FIG. 3 is a typical voltage output of a pulse width modulation inverter.

Referring to FIG. 1 shows a three phase DC-AC inverter bridge circuit 1. The bridge is made up of six switching devices such as the thyristors 2 through 7 shown. While gate turn-off (GTO) thyristors are presently preferred, other switching means, especially static devices are contemplated within the invention. The bridge forms three poles A,B,C, connected across the DC voltage source 10. While DC source 10 is represented by a battery in the diagram, other sources, such as capacitors, can be used. In the presently preferred embodiment of the invention free-wheeling diodes 8 provide reverse shunting paths around each GTO thyristor 2 through 7. The firing and logic circuit 9 provides gate signals to thyristors 2 through 7 to turn on and turn off the pole switches to provide the voltage waveforms as described herein. Firing and logic control 9 can use the fundamental voltage as a reference signal to control the phase between coordinated inverters in a multi-bridge circuit. Operation of firing circuits is well understood and in the diagram of other bridge circuits the firing and logic circuit is not shown, but will be understood to be incorporated.

The inverter scheme of the invention is now described in relation to the so-called doubly-fed quasi harmonic neutralized arrangement, which is the preferred embodiment. However, it should be understood that the invention is equally applicable to all other types of inverters using proper or "quasi" harmonic neutralization techniques.

Figure 5:
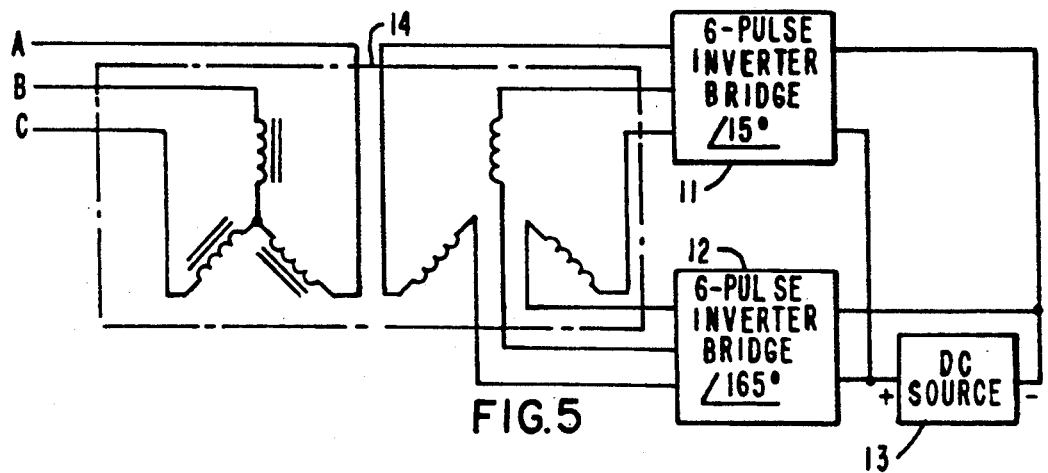
FIG. 5 is a schematic diagram of a quasi harmonic neutralized 12-pulse inverter.
Figure 6A:
FIG. 6A is a typical voltage output pole voltage waveform.
Figure 6B:
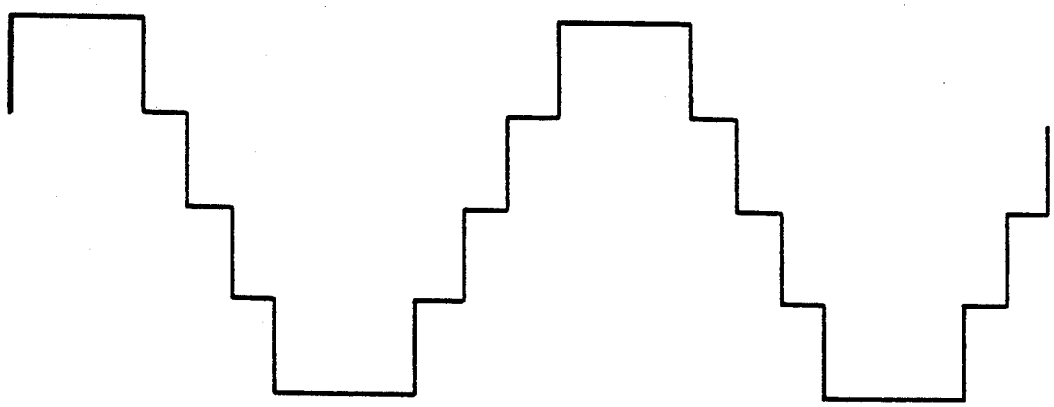
FIG. 6B is a typical line-to-line output voltage waveform.
Figure 6C:
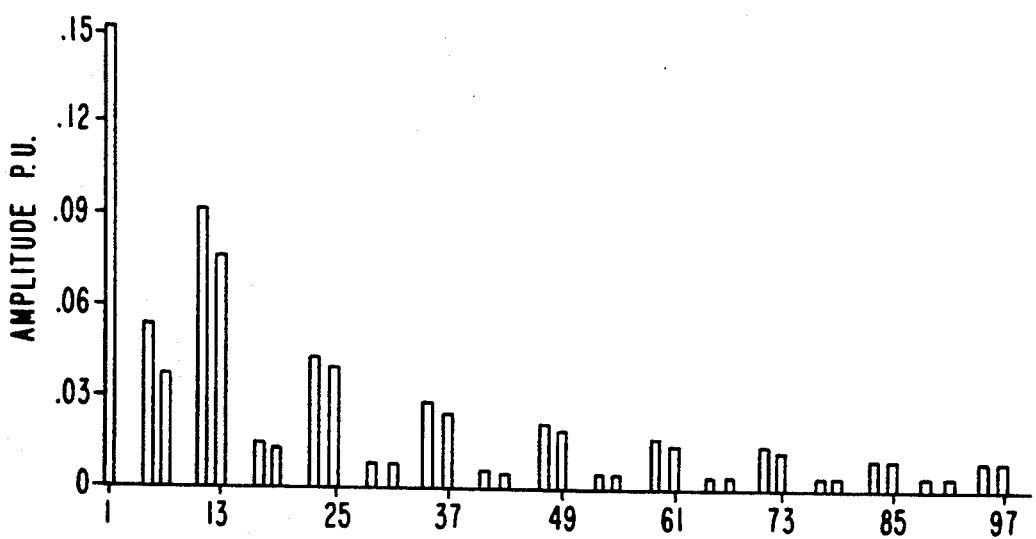
FIG. 6C is a typical graph of the corresponding harmonic spectrum of the waveform in FIG. 6B.

FIG. 5 shows a basic doubly fed quasi harmonic neutralized 12-pulse inverter. As illustrated in FIG. 6a, in its basic operation the inverter 11,12 (having GTO thyristors such as those in FIG. 1) are sequentially turned on and off by a firing and logic circuit such as 9 in FIG. 1. In this way the output of each "pole" (the junction of two switches connecting the output to the positive or the negative terminal of the DC supply 13) in each of the two inverters 11,12 produces a square wave with alternating positive and negative polarity. These square wave pole voltages are 120 electrical degrees displaced from each other and the sets of three pole voltages, produced by the two inverters, are displaced by 30 electrical degrees from each other. The resultant line to line output voltage is illustrated in FIG. 6b, and the corresponding harmonic spectrum is shown in FIG. 6c. As can be observed, although the quasi harmonic neutralization reduces the 5th and 7th (and all other harmonics of the order of 6k+/−1, where k=1,2, ...), their remaining magnitude is still significant.

Figure 7A:
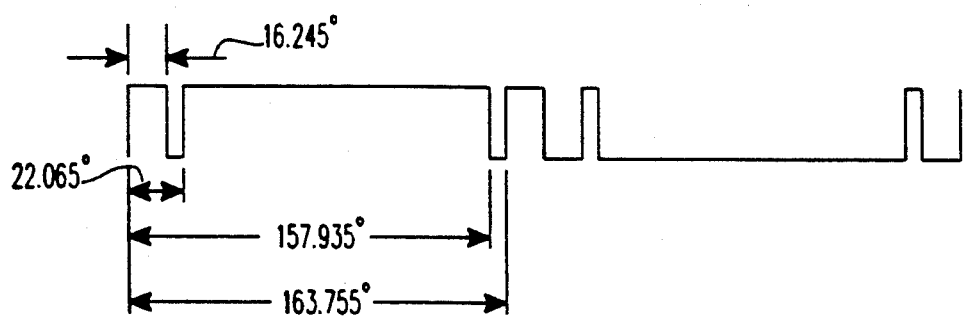
FIG. 7A shows a notched waveform of the pole voltage.
Figure 7B:
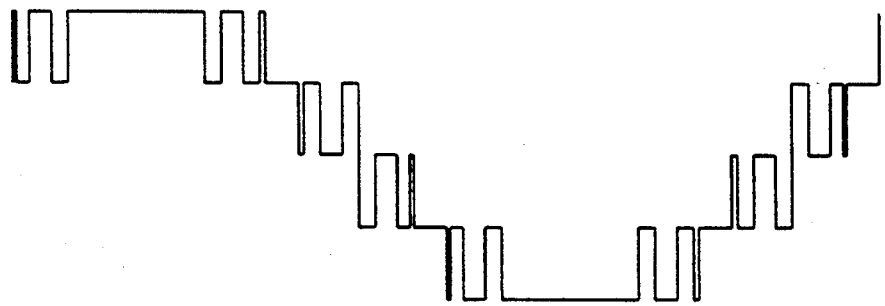
FIG. 7B shows the line-to-line voltage waveform resulting from the notched pole voltage.

In the inverter scheme of the invention the operation of the inverter switches is changed so that the most significant harmonics of the quasi harmonic neutralized output voltage waveform are eliminated or reduced. This is achieved by producing appropriate "notches" in the pole voltage waveforms (intervals during which the polarity of the pole voltage is reversed) and by changing the original 30 degree phase displacement of the two sets of pole voltages to some other value. For example two notches in each of the half periods of the pole voltage can be produced by switching from the positive supply voltage to the negative one at 16.245 and 157.935 degrees, respectively, and switching back from negative to positive at 22.065 and 163.755 degrees, respectively, as illustrated in FIG. 7a. These two notches eliminate the 5th and 7th harmonics from the output voltage. In addition, by changing the original phase displacement from 30 degrees to 7.552 degrees, the magnitude of the 11th and 13th harmonics is significantly reduced. The resultant line to line output voltage waveform is shown in FIG. 7b, and the corresponding harmonic spectrum in FIG. 7c. Comparison of the frequency spectrum shown in FIG. 6c for the original quasi harmonic neutralized inverter to that shown in FIG. 7c for the proposed scheme, clearly shows the significant improvement from the viewpoint of practical applications: the most troublesome two low order harmonics, the 5th and 7th, are eliminated and the next two, the 11th and 13th, are greatly reduced. At the same time, the simplicity of a single output coupling transformer is retained and the switching rate of the power semiconductors in the inverters remained relatively low.

Figure 7C:
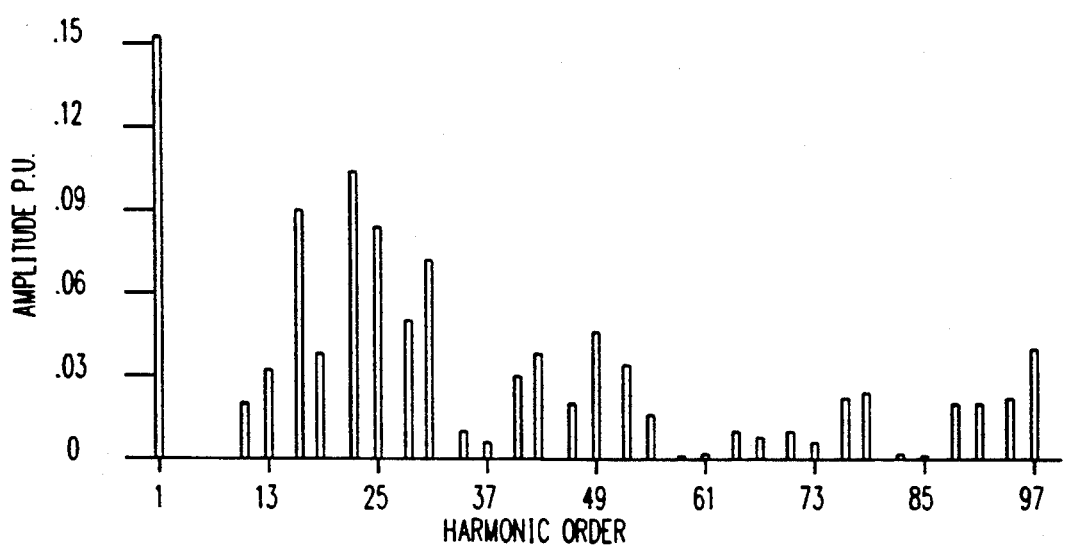
FIG. 7C shows the corresponding spectrum of the waveform of FIG. 7B.
Figure 8A:
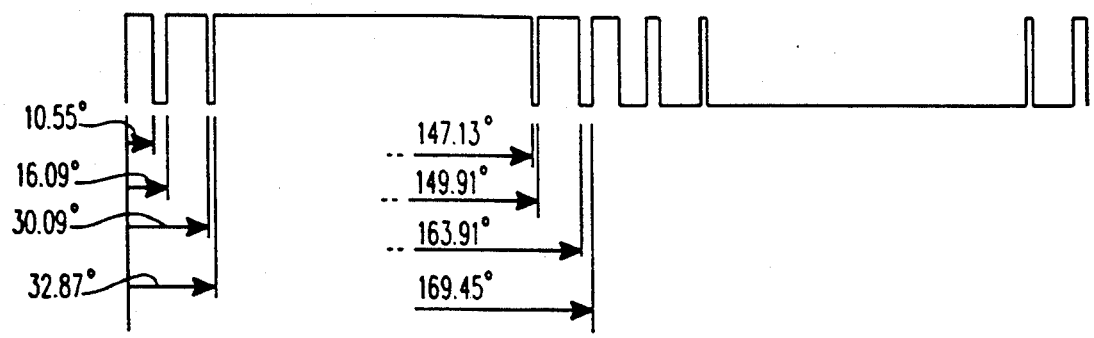
FIG. 8A shows a pole voltage waveform having four notches in each half-period.
Figure 8B:
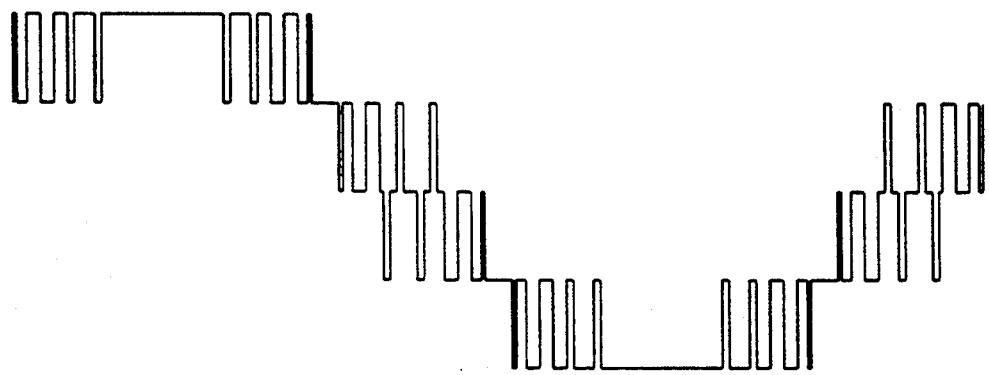
FIG. 8B is the resulting line-to-line waveform of FIG. 8A.
Figure 8C:
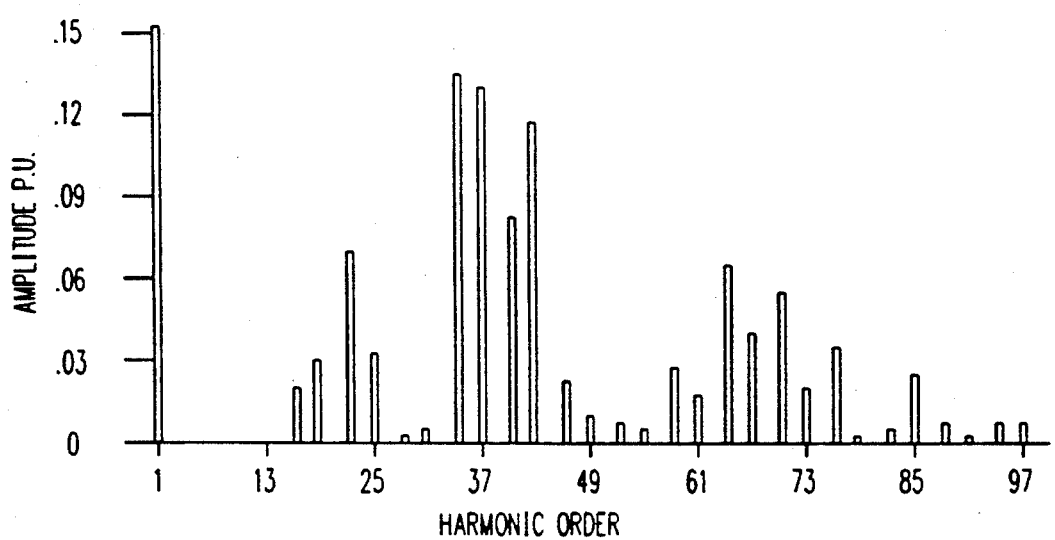
FIG. 8C shows a harmonic spectrum of the waveform of FIG. 8B.

If the switching rate of the power semiconductors in the inverters can be increased further, then further harmonics can be eliminated and reduced by creating additional notches and changing the phase displacement of the inverter voltages appropriately. For example, in FIG. 8a is shown an inverter pole voltage waveform with four notches in each half-period. These notches are produced by switching from positive to negative supply voltage at 10.55, 30.9 147.13, and 163.91 degrees, respectively, and switching back from negative to positive voltage at 16.09, 32.87, 149.91, and 169.45 degrees, respectively. These notches eliminate the 5th, 7th, 11th, and 13th harmonics. By establishing a 5 degree phase displacement between the two sets of inverter pole voltages, the magnitudes of the 17th and 19th can be significantly reduced. The resultant output line to line voltage with the above defined notches and phase displacement is shown in FIG. 8b and the corresponding harmonic spectrum in FIG. 8c. Comparison between FIGS. 7c and 8c shows the significant improvement in the harmonic spectrum albeit at the expense of somewhat increased switching rate of the semiconductors in the inverters.

Figure 9:
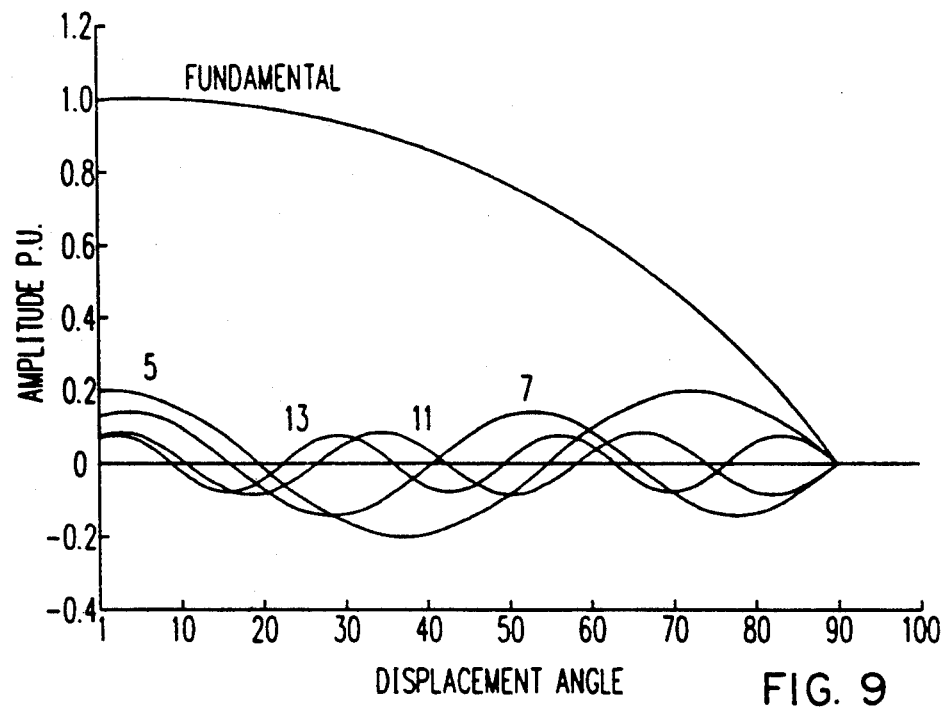
FIG. 9 is a graph of phase displacement angles and the magnitudes for various harmonics.

The above two examples for preferred embodiments indicate that the harmonic spectrum of the simple quasi 12-pulse inverter can be optimized for particular applications by the judicious combination of selected notches and phase displacement angles. For the selection of the proper phase displacement FIG. 9 is provided which shows the relationship between the phase displacement angle and the magnitudes of harmonics present in the basic (notchless) output voltage waveform.

Figure 10:
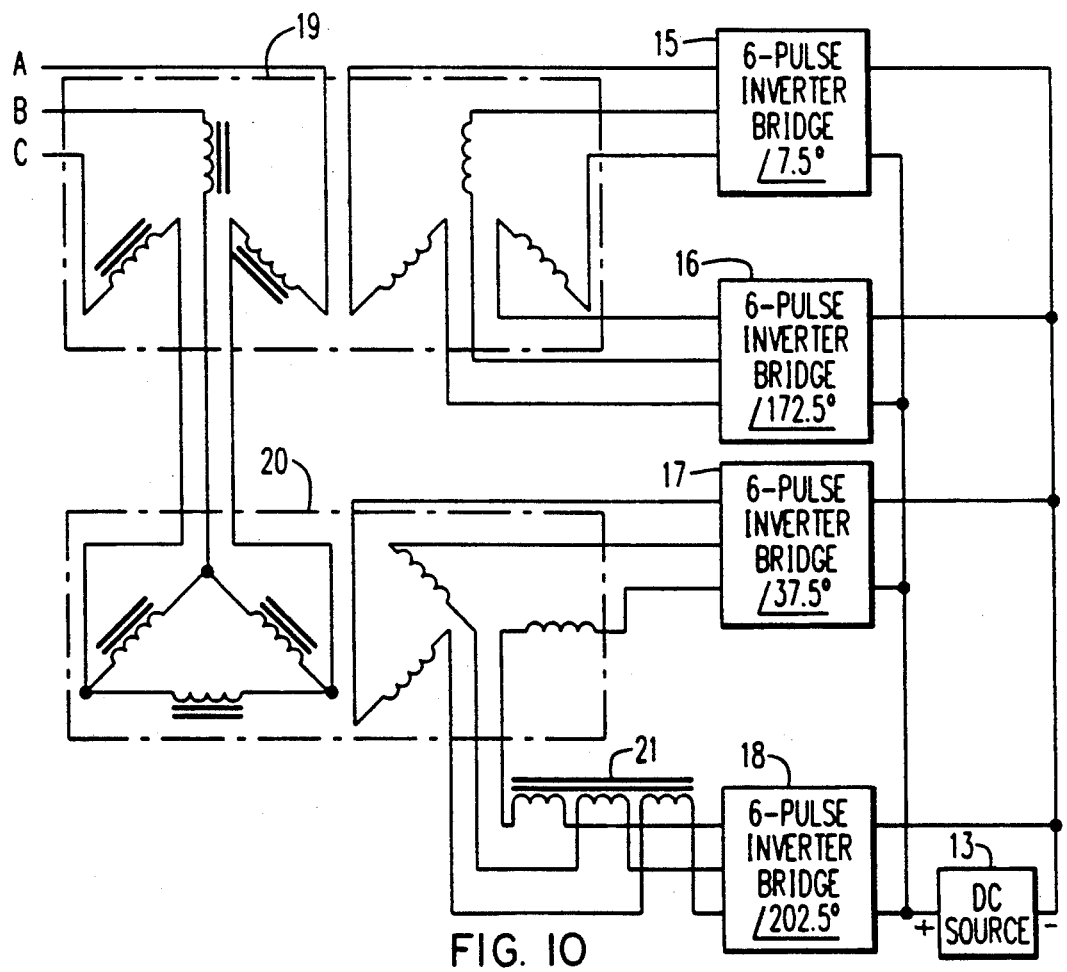
FIG. 10 shows the schematic diagram of a doubly fed 24-pulse inverter.
Figure 11:
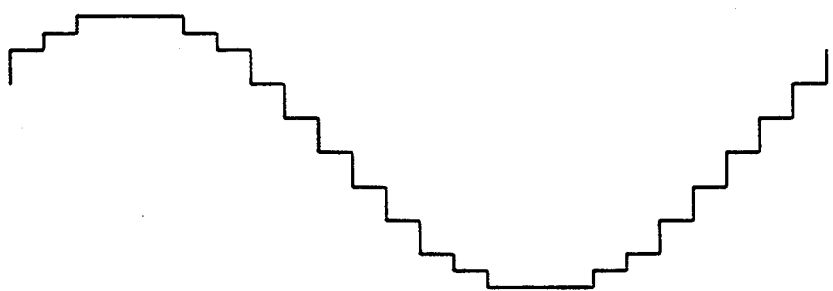
FIG. 11 shows a typical line-to-line voltage waveform of the inverter of FIG. 10.
Figure 12:
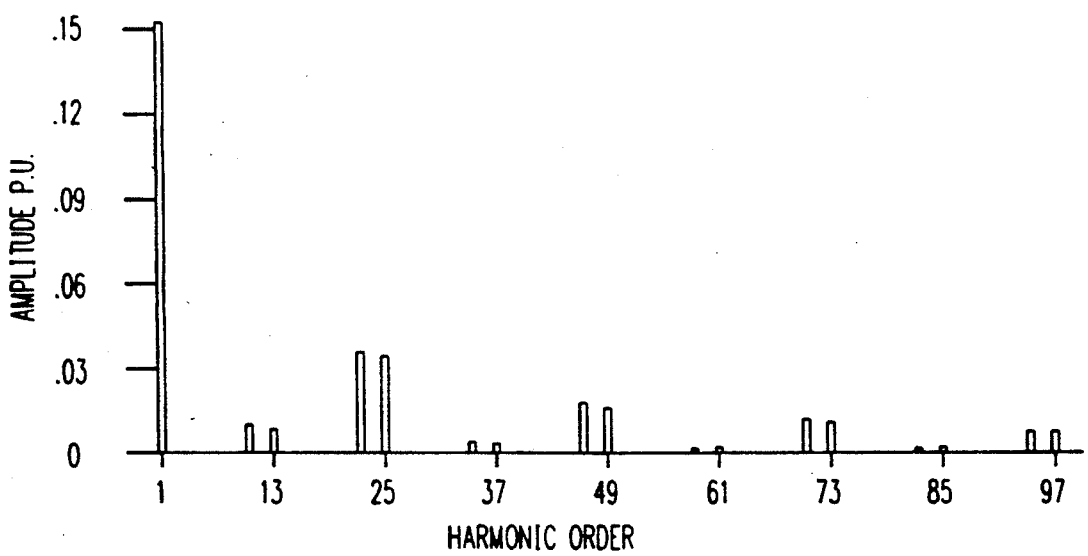
FIG. 12 shows the harmonic spectrum of the waveform of FIG. 11.

The optimized inverter scheme described above can be extended to pulse numbers different from 12. A doubly fed 24-pulse inverter is particularly important in high power applications. Such an inverter with normal quasi harmonic neutralization is described in previously referenced U.S. Pat. No. 4,870,557 and is shown schematically in FIG. 10 of this disclosure. The first two inverters 15,16, feeding the secondary windings of the wye to wye transformer 19, are operated to produce two sets of normal square wave pole voltages of opposite polarity, which are displaced from each other by 15 degrees. (For example, if the first set is at zero displacement with respect to the chose reference, then the second set is at 165 degrees with respect to the same reference.) The second two inverters 17,18, feeding the secondary windings of the delta to wye transformer 20 (via a zero sequence blocking transformer 21), are also operated at 15 degree relative phase displacement, but the two sets of pole voltages they produce are displaced from those of the first two inverters by 30 degrees. (with respect to the above chose reference, the second two sets of pole voltages are displaced by −30 and 135 degrees, respectively.) This arrangement produces a primary voltage waveform of the prior art type illustrated in FIG. 11. The harmonic spectrum of this waveform is shown in FIG. 12. It can be observed that the quasi harmonic neutralization leaves some residual harmonics, which would be absent in the output of a properly neutralized 24-pulse inverter, such as the 11th and 13th.

Figure 13A:
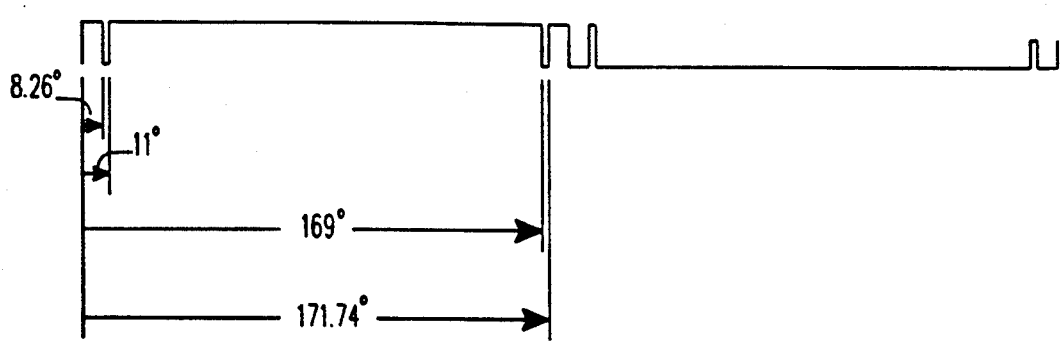
FIG. 13A shows a pole voltage waveform having two notches in each half cycle as could result from a 24-pulse inverter of FIG. 10.
Figure 13B:
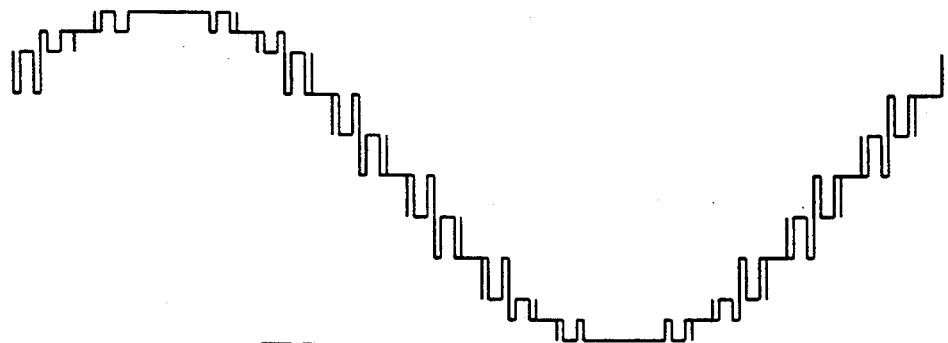
FIG. 13B shows the line-to-line voltage of the waveform of FIG. 13A.
Figure 13C:
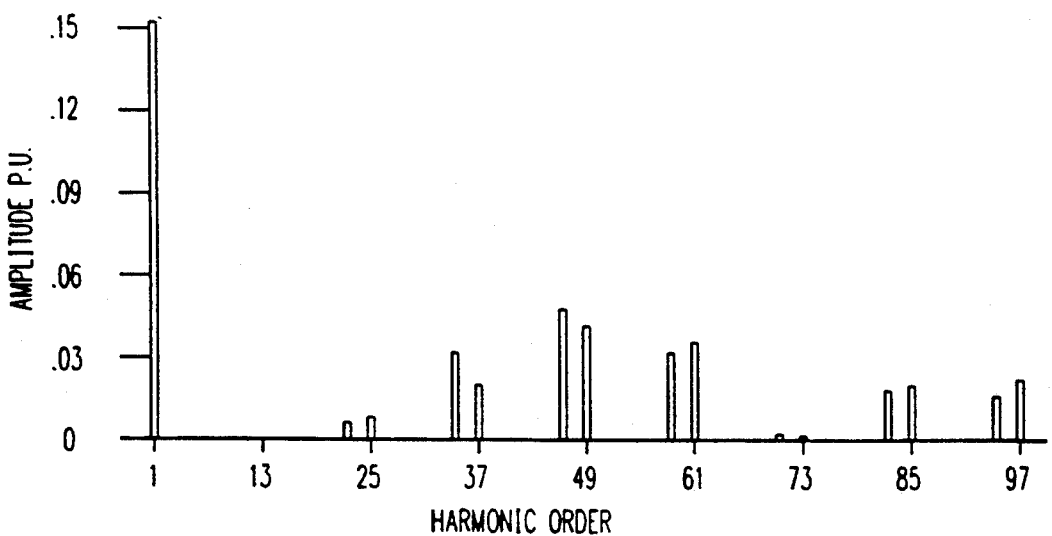
FIG. 13C shows the harmonic spectrum of the waveform of FIG. 13B.

The frequency spectrum of the quasi harmonic neutralized, 24-pulse inverter can be improved significantly by the use of our invention. For example, two notches in each half period, produced by switching each pole output from the positive terminal of the supply voltage to the negative one at 8.26 and 169 degrees, and back to the positive at 11 and 171.74 degrees (these angles are with respect to each of the relevant pole voltage), as illustrated in FIG. 13a, will eliminate the 11th and 13th harmonics. If the phase displacement between each set of two inverters feeding the secondary of the same transformer is set to 7.5 degrees, then the magnitudes of the 23rd and 25th harmonics will be minimized. The resultant line to line output voltage waveform obtained at the primary side of the coupling transformers is shown in FIG. 13b. The corresponding frequency spectrum is shown in FIG. 13c. By comparing FIG. 13c to FIG. 12, it can be observed that the optimization scheme does, from a practical viewpoint, significantly improve the spectrum by eliminating or minimizing the lowest order harmonics without increasing the complexity of the inverter circuit or the switching rate of the power semiconductor employed.

Figure 4:
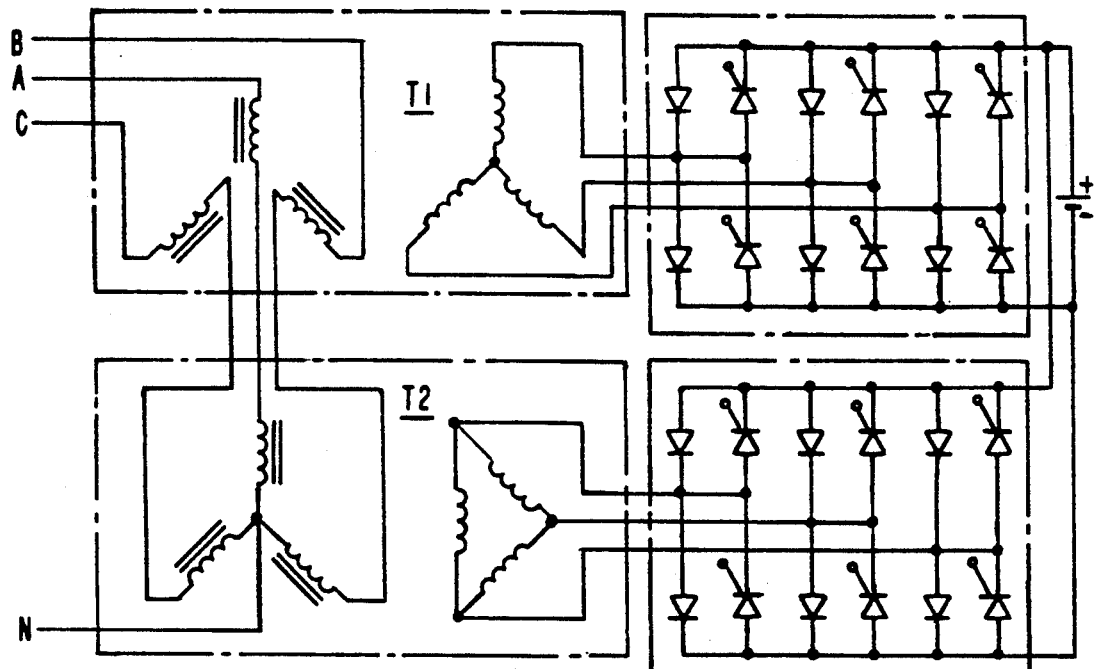
FIG. 4 is a schematic diagram of a multi-phase harmonic neutralized 12-pulse state inverter.

It is pointed out again that the invention can be applied to the same circuit configuration, but with different spaced notches and with different phase displacement of the inverters and transformers to shape the harmonic spectrum according to particular application requirements. Similarly, the technique can be applied to other circuit configurations described in U.S. Pat. No. 4,870,557, or in other configured inverters such as that shown in FIG. 4.

The elimination or suppression of various harmonics are dependent upon the placement of the notches. It has been found to be desirable to place the notches toward the edges of the waveform to suppress the harmonics without unduly diminishing the amplitude of the fundamental. It is presently preferred to place at least one notch between 0 degrees and 45 degrees with at least one notch between 135 degrees and 180 degrees. For some applications it is desirable to have two notches within each of these ranges to remove the undesired harmonic.

Another preferred embodiment includes a notch that is on the very edge of the waveform. This notch can be easily controlled because the respective turn-on and turn-off are delayed, creating a single phase angle such as a pair of notches from 0 degrees to 5 degrees and 175 degrees to 180 degrees. With such a single edge pair of notches the phase angle can be selected to eliminate a specific harmonic, or to reduce an adjacent pair of harmonics. Other specific notching values will be understood by those skilled in the art.

While specific embodiments of the invention have been described in detail, it will be appreciated by those skilled in the art that various modifications and alternatives to those described ca be developed in view of these teachings. Accordingly, the particular arrangements disclosed are meant to be illustrative only and not limiting as to the scope of the invention, which is to be given the full breadth of the appended claims and any and all equivalents thereof.

We claim:

1. A three-phase power inverter for reducing undesired harmonics of a fundamental AC output comprising:
   means for providing a DC voltage;
   at least two inverter bridge circuits;
   said inverter bridge circuits having switching means controllable to provide a notched pole voltage waveform output;
   said inverter bridge circuits having their respective outputs phase displaced; and
   transformer means connected to the respective outputs of said inverter bridges for combining said respective outputs into a single AC voltage waveform, said switching means providing notching in the pole voltage every half cycle between 0 degrees to 45 degrees and 135 degrees to 180 degrees, at least two notches between 0 degrees and 45 degrees, and at least two notches between 135 degrees and 180 degrees.

2. A three-phase power inverter for reducing undesired harmonics of a fundamental AC output comprising:
   means for providing a DC voltage;
   at least two inverter bridge circuits;
   said inverter bridge circuits having switching means controllable to provide a notched pole voltage waveform output;
   said inverter bridge circuits having their respective outputs phase displaced; and
   transformer means connected to the respective outputs of said inverter bridges for combining said respective outputs into a single AC voltage waveform, said switching means providing two notches in the pole voltage every half cycle between 0 degrees to 45 degrees and 135 degrees to 180 degrees, a first notch beginning at 0 degrees and a second notch ending at 180 degrees.

3. A three-phase power inverter for reducing undesired harmonics of a fundamental AC output comprising:
   means for providing a DC voltage;
   at least two inverter bridge circuits;
   said inverter bridge circuits having switching means controllable to provide a notched pole voltage waveform output;
   said inverter bridge circuits having their respective outputs phase displaced; and transformer means connected to the respective outputs of said inverter bridges for combining said respective outputs into a single AC voltage waveform, said switching means providing notching in the pole voltage every half cycle, at least two notches between 0 degrees and 45 degrees, and at least two notches between 135 degrees and 180 degrees.

4. A three-phase power inverter for reducing undesired harmonics of a fundamental AC output comprising:
   means for providing a DC voltage;

at least two inverter bridge circuits;

said inverter bridge circuits having switching means controllable to provide a notched pole voltage waveform output;

said inverter bridge circuits having their respective outputs phase displaced; and transformer means connected to the respective outputs of said inverter bridges for combining said respective outputs into a single AC voltage waveform, said transformer means includes phase shifting at least one of the waveform outputs of said inverter bridge circuits, and said switching means providing notching in the pole voltage every half cycle, at least two notches between 0 degrees and 45 degrees, and at least two notches between 135 degrees and 180 degrees.

5. A three-phase power inverter for reducing undesired harmonics of a fundamental AC output comprising:

means for providing a DC voltage;

at least two inverter bridge circuits;

said inverter bridge circuits having switching means controllable to provide a notched pole voltage waveform output;

said inverter bridge circuits having their respective outputs phase displaced; and transformer means connected to the respective outputs of said inverter bridges for combining said respective outputs into a single AC voltage waveform, said transformer means includes phase shifting at least one of the waveform outputs of said inverter bridge circuits, and said switching means providing two notches in the pole voltage every half cycle, a first notch beginning at 0 degrees and a second notch ending at 180 degrees.

6. A three-phase power inverter for reducing undesired harmonics of a fundamental AC output comprising:

means for providing a DC voltage;

at least two inverter bridge circuits;

said inverter bridge circuits having switching means controllable to provide a notched pole voltage waveform output;

said inverter bridge circuits having their respective outputs phase displaced; and transformer means connected to the respective outputs of said inverter bridges for combining said respective outputs into a single AC voltage waveform, said transformer means includes phase shifting at least one of the waveform outputs of said inverter bridge circuits, said switching means providing notching in the pole voltage in every half cycle between 0 degrees to 45 degrees and 135 degrees to 180 degrees.

7. A three-phase power inverter for reducing undesired harmonics of a fundamental AC output comprising:

means for providing a DC voltage;

at least two inverter bridge circuits;

said inverter bridge circuits having switching means controllable to provide a notched pole voltage waveform output;

said inverter bridge circuits having their respective outputs phase displaced; and transformer means connected to the respective outputs of said inverter bridges for combining said respective outputs into a single AC voltage waveform, said transformer means includes phase shifting at least one of the waveform outputs of said inverter bridge circuits, said switching means providing notching in the pole voltage in every half cycle between 0 degrees to 45 degrees and 135 degrees to 180 degrees, said switching means is controllable to provide notching in the pole voltage every half cycle, at least two notches between 0 degrees and 45 degrees, and at least two notches between 135 degrees and 180 degrees.

8. A three-phase power inverter for reducing undesired harmonics of a fundamental AC output comprising:

means for providing a DC voltage;

at least two inverter bridge circuits;

said inverter bridge circuits having switching means controllable to provide a notched pole voltage waveform output;

said inverter bridge circuits having their respective outputs phase displaced; and transformer means connected to the respective outputs of said inverter bridges for combining said respective outputs into a single AC voltage waveform, said switching means providing two notches in the pole voltage per half cycle, one notch between 0 degrees and 45 degrees, and one notch between 135 degrees and 180 degrees, said notching of the pole voltage is used to reduce harmonics and said single AC voltage waveform is used to control the lead and lag reactive currents of an AC power system.

9. A three-phase power inverter for reducing undesired harmonics of a fundamental AC output comprising:

means for providing a DC voltage;

at least two inverter bridge circuits;

said inverter bridge circuits having switching means controllable to provide a notched pole voltage waveform output;

said inverter bridge circuits having their respective outputs phase displaced; and transformer means connected to the respective outputs of said inverter bridges for combining said respective outputs into a single AC voltage waveform, said switching means providing notching in the pole voltage every half cycle, at least two notches between 0 degrees and 45 degrees, and at least two notches between 135 degrees and 180 degrees, said notching of the pole voltage is used to reduce harmonics and said single AC voltage waveform is used to control the lead and lag reactive currents of an AC power system.

10. A three-phase power inverter for reducing undesired harmonics of a fundamental AC output comprising:

means for providing a DC voltage;

at least two inverter bridge circuits;

said inverter bridge circuits having switching means controllable to provide a notched pole voltage waveform output;

said inverter bridge circuits having their respective outputs phase displaced; and transformer means connected to the respective outputs of said inverter bridges for combining said respective outputs into a single AC voltage waveform, said switching means providing two notches in the pole voltage every half cycle, a first notch beginning at 0 degrees and a second notch ending at 180 degrees, said notching of the pole voltage is used to reduce harmonics and said single AC voltage waveform is used to control the lead and lag reactive currents of an AC power system.

11. A three-phase power inverter for reducing undesired harmonics of a fundamental AC output comprising:

means for providing a DC voltage;
at least two inverter bridge circuits having two six-pulse inverter bridge circuits, the first displaced at 15 degrees, and the second displaced at 165 degrees;
said inverter bridge circuits having switching means controllable to provide a notched pole voltage waveform output;
said inverter bridge circuits having their respective outputs phase displaced; and
transformer means connected to the respective outputs of said inverter bridges for combining said respective outputs into a single AC voltage waveform, said switching means providing a pole voltage notch positioned between 16 degrees and 23 degrees, and a notch between 157 degrees and 164 degrees in every half cycle.

12. The three-phase power inverter of claim 11 wherein said transformer means includes a wye-wye transformer.

13. A three-phase power inverter for reducing undesired harmonics of a fundamental AC output comprising:

means for providing a DC voltage;
at least two inverter bridge circuits having two six-pulse inverter bridge circuits, the first displaced at 15 degrees, and the second displaced at 165 degrees;
said inverter bridge circuits having switching means controllable to provide a notched pole voltage waveform output;
said inverter bridge circuits having their respective outputs phase displaced; and
transformer means connected to the respective outputs of said inverter bridges for combining said respective outputs into a single AC voltage waveform, said switching means providing notching of the pole voltage every half cycle at 16.245 degrees to 22.065 degrees, and at 157.935 degrees to 163.755 degrees.

14. A three-phase power inverter for reducing undesired harmonics of a fundamental AC output comprising:

means for providing a DC voltage;
at least two inverter bridge circuits having two six-pulse inverter bridge circuits, the first displaced at 15 degrees, and the second displaced at 165 degrees;
said inverter bridge circuits having switching means controllable to provide a notched pole voltage waveform output;
said inverter bridge circuits having their respective outputs phase displaced; and
transformer means connected to the respective outputs of said inverter bridges for combining said respective outputs into a single AC voltage waveform, said switching means providing notches located on every half cycle between the following ranges: 10 degrees to 17 degrees; 30 degrees to 33 degrees; 147 degrees to 150 degrees; and 163 degrees to 170 degrees.

15. The three-phase power inverter of claim 14 wherein said transformer means includes a wye-wye transformer.

16. A three-phase power inverter for reducing undesired harmonics of a fundamental AC output comprising:

means for providing a DC voltage;
at least two inverter bridge circuits having two six-pulse inverter bridge circuits, the first displaced at 15 degrees, and the second displaced at 165 degrees;
said inverter bridge circuits having switching means controllable to provide a notched pole voltage waveform output;
said inverter bridge circuits having their respective outputs phase displaced; and
transformer means connected to the respective outputs of said inverter bridges for combining said respective outputs into a single AC voltage waveform, said switching means providing notching the pole voltage every half cycle at 10.55 degrees to 16.09 degrees, and 30.90 degrees to 32.87 degrees, and 147.13 degrees to 149.91 degrees, and 163.91 degrees to 169.45 degrees.

17. A three-phase power inverter for reducing undesired harmonics of a fundamental AC output comprising:

means for providing a DC voltage;
at least two inverter bridge circuits having four six-pulse inverter bridge circuits having the first displaced by 7.5 degrees, the second by 172.5 degrees, the third by 37.5 degrees, and the fourth by 202.5 degrees;
said inverter bridge circuits having switching means controllable to provide a notched pole voltage waveform output;
said inverter bridge circuits having their respective outputs phase displaced; and
transformer means connected to the respective outputs of said inverter bridges for combining said respective outputs into a single AC voltage waveform, said switching circuit providing a notch in the pole voltage every half cycle located in the ranges from 8 degrees to 12 degrees, and from 169 degrees to 172 degrees.

18. The three-phase power inverter of claim 17 wherein said transformer means includes a wye-wye transformer connected to the outputs of said first and second inverters, bridge circuits, and a wye-delta transformer connected to the outputs of said third and fourth inverter bridge circuits.

19. A three-phase power inverter for reducing undesired harmonics of a fundamental AC output comprising:

means for providing a DC voltage;
at least two inverter bridge circuits having four six-pulse inverter bridge circuits having the first displaced by 7.5 degrees, the second by 172.5 degrees, the third by 37.5 degrees, and the fourth by 202.5 degrees;
said inverter bridge circuits having switching means controllable to provide a notched pole voltage waveform output;
said inverter bridge circuits having their respective outputs phase displaced; and transformer means connected to the respective outputs of said inverter bridges for combining said respective outputs into a single AC voltage waveform, said switching circuit providing a notch from 8.26 degrees to 11 degrees, and from 169 degrees to 171.74 degrees in every half cycle.

20. A method of changing a DC voltage source to an AC output while reducing undesired harmonics of the fundamental AC output comprising:

switching a plurality of six-pulse inverter bridges while maintaining a preselected displacement angle between the voltage output waveform of said bridges;

notching the pole voltage waveforms of said bridges;

combining the outputs of said bridges by transformers into a single AC voltage waveform, said pole voltage waveforms are notched twice in each half cycle, the first beginning at 0 degrees, and the second ending at 180 degrees, said pole voltage waveforms are notched between 0 degrees and 45 degrees and between 135 degrees and 180 degrees in each half cycle.

* * * * *